Figure 1:
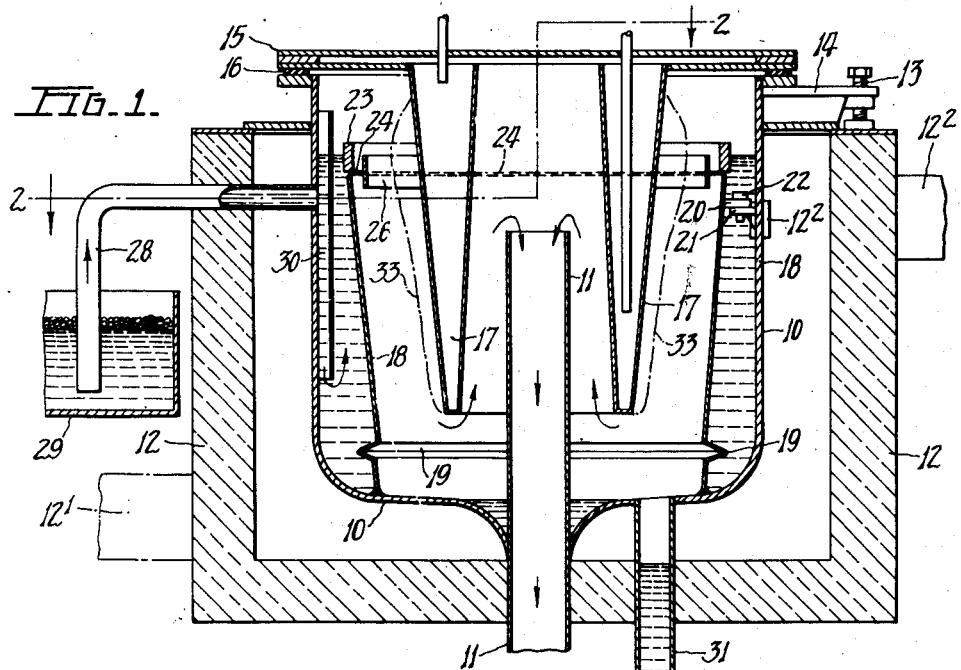

Oct. 28, 1952     T. R. A. DAVEY     2,615,706
DISTILLATION OF METALS

Filed July 17, 1950     2 SHEETS—SHEET 1

Inventor
Thomas R. A. Davey,
By Pierce, Scheffler & Parker,
Attorneys.

Patented Oct. 28, 1952

2,615,706

UNITED STATES PATENT OFFICE 2,615,706

DISTILLATION OF METALS

Thomas R. A. Davey, Port Pirie, South Australia, Australia, assignor to The Broken Hill Associated Smelters Proprietary Limited, Melbourne, Victoria, Australia, a company of Victoria Application July 17, 1950, Serial No. 174,206
In Australia August 5, 1949

15 Claims. (Cl. 266—19)

This invention relates to the refining of metals by distillation and has been devised primarily to facilitate the separation and recovery of zinc from lead containing same, particularly lead bullion which has previously been desilverised by adding zinc thereto.

It has previously been proposed to separate zinc from lead by a batch distillation process and to recover same in the metallic form by condensing the zinc vapor. In this prior process a body of molten zinciferous lead within a distillation chamber has an extended horizontal surface which is continually renewed by agitating the metal, such extended surface being subjected to a gaseous pressure of not more than about 10 millimeters of mercury and being disposed below an extended horizontal watercooled surface on which the zinc vapor is condensed in the form of solid metal.

Now the general object of this invention is to provide improvements in the separation of a relatively volatile constituent from a molten metal complex and particularly in the recovery of zinc from zinciferous lead, while one specific object is to provide a continuous treatment apparatus.

Accordingly, the invention broadly includes means for separating and recovering a relatively volatile constituent from a molten metal complex comprising progressively directing the molten metal by gaseous pressure from an external body thereof into an upper portion of a chamber, causing the molten metal to descend in an attenuated condition within the chamber and discharging same from a lower portion thereof, maintaining the interior of the chamber at a sufficiently low pressure to cause the said volatile constituent to be progressively evaporated therefrom and maintaining a relatively cool condensing zone within the chamber whereby the vapor evolved therein is progressively condensed.

The expression "attenuated condition" is intended to comprehend any condition in which the free or exposed surface area thereof is large in proportion to the volume of the metal.

Thus the proportion of the volatile constituent present in said metal is progressively reduced as the molten metal passes through the said recovery chamber from the inlet to the outlet.

Preferably, the molten metal is caused to pass downwardly through the chamber in the form of one or more thin films, layers or streams or in the sub-divided condition and said condensing zone is preferably arranged more or less vertically within the recovery chamber in proximity to the exposed surface of the molten metal passing therethrough.

Apparatus in accordance with the invention comprises a recovery chamber adapted to be maintained under a low pressure, means for continuously supplying to an upper portion of said chamber, the molten metal to be treated, means for continuously discharging treated molten metal from a lower portion of said chamber, means for causing the molten metal to pass downwardly in attenuated condition through said chamber and means within the chamber for condensing thereon the metallic vapor evolved therein.

In the preferred form of the invention, a substantially vertical elongated condenser is arranged substantially centrally within the chamber and is spaced from a surrounding substantially vertically extending spreading surface and means are provided for directing the incoming molten metal to the top of such spreading surface, whereby same is caused to flow downwardly thereover.

For this purpose the upper end of said spreading surface may be defined by a horizontal weir which substantially completely surrounds the condenser and over which the molten metal is caused to flow in the form of a relatively thin stream.

Alternatively the said spreading surface may be formed with a helical channel.

Figure 3:
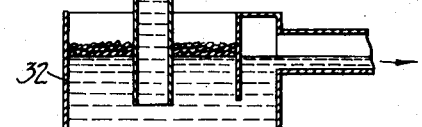
Figure 2:
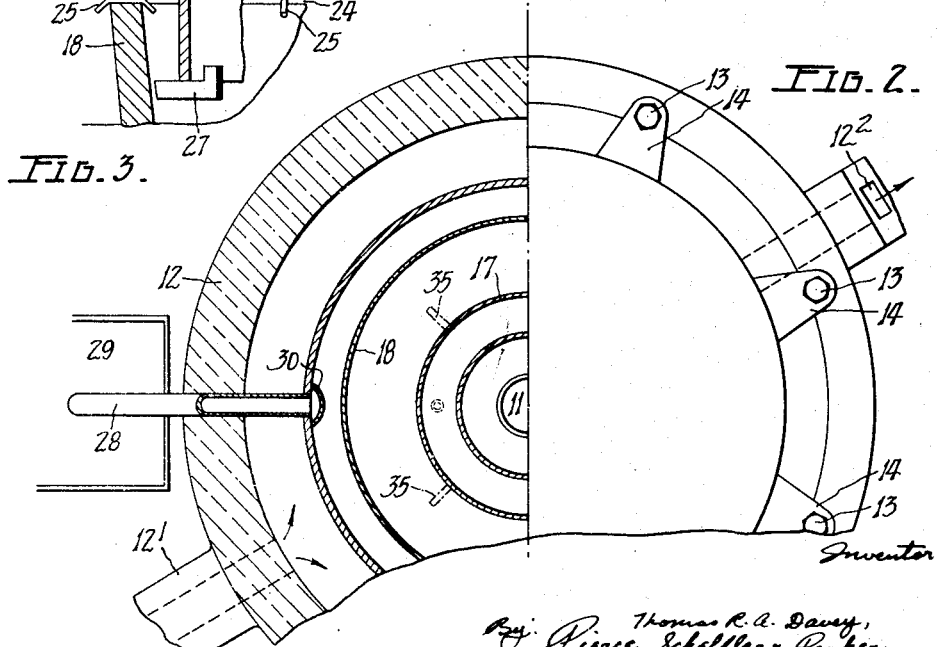
Figure 5:
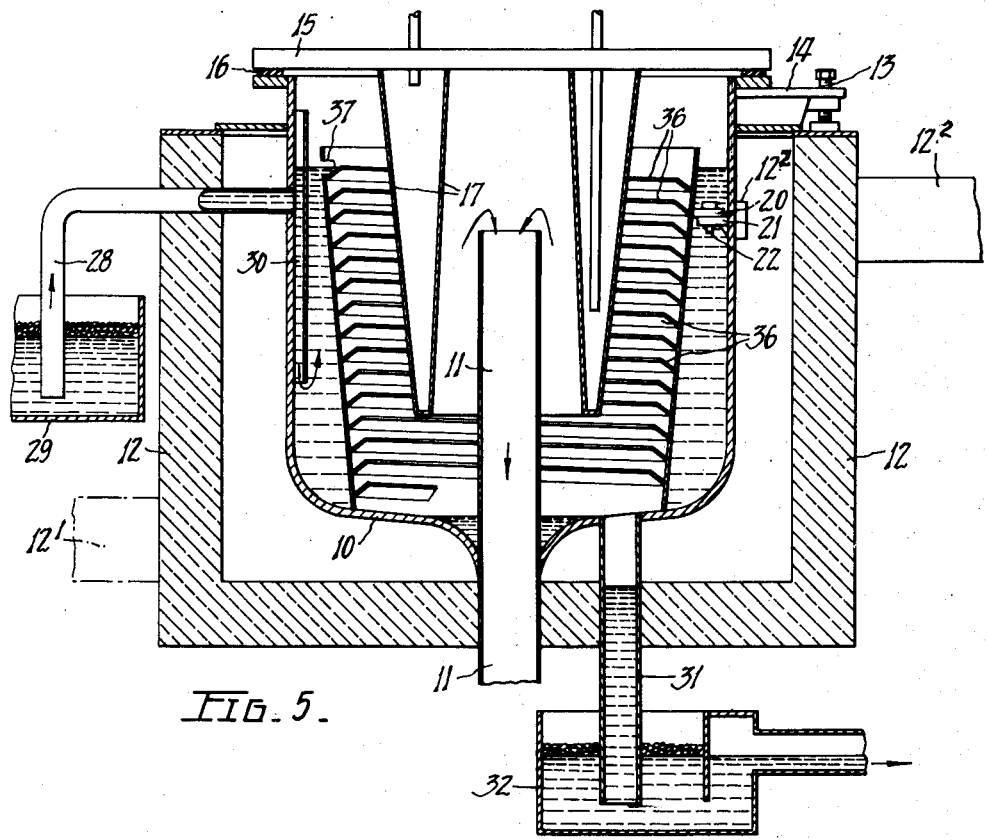
Figure 4:
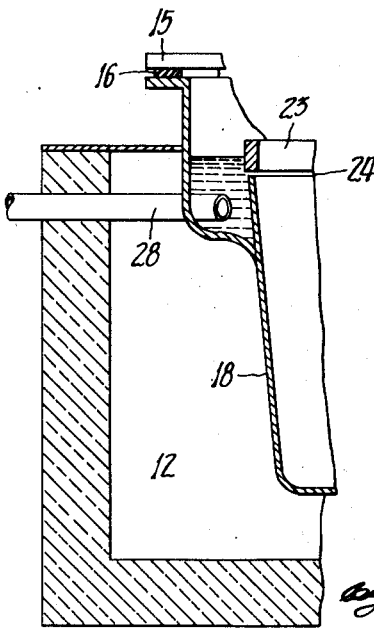

For a more particular description of exemplary embodiments of the invention, reference will be made to the accompanying drawings, in which:

Figure 1 is a view in sectional elevation of the preferred form of vacuum distillation apparatus incorporating the invention, Figure 2 is a view half in plan and half in sectional plan on the line 2—2 of Figure 1, Figure 3 is a view to a larger scale of a portion of Figure 1, Figure 4 is a view in sectional elevation of a portion of a vacuum chamber of modified construction, and Figure 5 is a view similar to Figure 1 and shows a modification in the construction of the spreading surface.

The distillation apparatus shown in Figures 1, 2 and 3 of the drawings has been devised primarily for the separation of zinc from lead bullion which has previously been desilverised by adding zinc thereto.

This apparatus comprises a vertical cylindrical vessel 10 which is open at its upper end and which has a vertical vacuum pipe 11 extending upwardly through the center of the bottom thereof.

The top of the vessel 10 projects upwardly through an encircling brick structure 12 and same as supported thereon by a plurality of adjustable levelling screws 13 which are fitted to outwardly projecting lugs 14 on the vessel as shown in Figure 1.

The structure 12 is provided with supply and discharge flues 12' and 122 respectively whereby furnace gases may be circulated around the vessel to maintain the desired temperature thereof.

The open upper end of the vessel is normally closed by a detachable air-tight and water-cooled cover 15, the seal therebetween being formed by a compressed ring 16 of rubber or other suitable material.

An elongated annular water-cooled condenser 17 is secured centrally to the under-surface of, and depends vertically from, the cover 15 with its lower end disposed relatively close to the bottom of the vessel 10. The outer peripheral surface of this condenser is convergent downwardly while its inner peripheral surface is preferably convergent upwardly as shown, and has a diameter substantially greater than that of the vacuum pipe 11 which projects some distance thereinto. When the apparatus is in use cooling water is circulated through the cover 15 and condenser 17 in any convenient manner.

A downwardly convergent spreading tube 18, which at its upper end is only a little smaller in diameter than the vessel 10, is arranged concentrically within the latter and the upper end thereof which is disposed relatively close to the top of the vessel is machined so as to form a plane surface.

The lower end of the tube 18 is welded to the bottom of the vessel 10 and a flexible joint 19 formed of thin metal is incorporated in the tube near its lower end, whereby same may be supported adjacent its upper end by a plurality of external lugs 20, which rest on brackets 21 secured to the inner periphery of the vessel 10, and which are located thereon by pins 22 which extend through clearance holes in such lugs and brackets.

As these brackets 21 are disposed adjacent to the external lugs 14 for the supporting and levelling screws 13, the machined upper end of the tube 18 may be arranged horizontally by adjustment of the screws.

A circular control ring 23 which is approximately equal in diameter to the upper end of the tube 18 is arranged coaxially above the latter, so as to form a narrow annular slot 24 therebetween and the lower end of this ring is also preferably machined to ensure that this slot is uniform in width.

In the illustrated construction, the control ring is supported on the tube 18 by a plurality of spacing members 25 which may conveniently be formed of wire and which determine the width of the slot 24.

A splash guard in the form of a vertical metal ring 26 is arranged concentrically within and spaced from the upper and lower ends respectively of the tube 18 and control ring 23 and same is supported on a plurality of lugs 27 which project inwardly from the said tube and this splash guard serves to direct downwardly onto the inner peripheral surface of the tube, the molten metal which passes inwardly through the slot 24 as hereafter described.

A ... the molten metal to be treated, ... adjacent one end thereof, to the wall ... 10 adjacent the level of the top of the ... ng tube 18, so that such metal is delivered ... the annular space around such tube while th... posite end of such pipe is submerged in a bath 29 of molten metal, the free surface of which is subjected to atmospheric pressure and which is disposed at a distance slightly less than the height of a barometric column of such metal below the level of the annular slot 24.

Thus when a high vacuum is produced within the vessel 10, the molten metal is forced by atmospheric pressure into the vacuum chamber until its free surface is disposed somewhat above the slot 24 as shown in Figure 3.

In order to prevent undue disturbance of the molten metal, within the annular well of the chamber by the incoming metal, the discharge end of the supply pipe 28 preferably communicates with a vertical open ended passage 30 which is formed by welding a curved metal plate to the inner surface of the vessel as shown in Figures 1 and 2, the upper end of such passage being disposed above the level of the molten metal within the chamber, so that the incoming metal is directed into a lower portion of the annular well.

Accordingly, the head of the molten metal above the level of the annular slot 24 maintains a steady flow through the latter and such metal then passes downwardly in the form of a thin tubular stream over the inner surface of the spreading tube 18 to the bottom of the chamber from which it is progressively discharged through a pipe 31 which has its lower end submerged in a bath 32 of the treated metal, whereby a barometric column of metal is maintained in such pipe to form a vacuum seal.

In using the described apparatus for the treatment of desilverised lead bullion in order to separate the zinc therefrom, bullion at a temperature of about 500°–700° C. is supplied to the bath 29 at such a rate that the level therein is maintained substantially constant while the interior of the chamber is evacuated by means of a pump (not shown) which is connected to the vacuum pipe 11, so that the pressure therein is reduced to the order of about 10–100 microns of mercury.

It is to be noted that the upper end of the vacuum pipe communicates with the interior of the chamber, only through the lower portion of the central passage in the annular condenser, so that the molten metal descending over the surface of the spreading tube 18 is subjected to the lowest pressure just prior to its discharge from the chamber.

Thus zinc is progressively evaporated from the molten lead as it descends within the chamber and the depth of the latter is so related to the rate of flow that the zinc content is reduced to the required value before the residual metal is discharged through the pipe 31.

If desired the flow of the molten metal over the inner surface of the spreading tube 18 may be retarded such as by covering such surface with wire mesh or by arranging one or more wires or the like helically thereon.

The temperature of the condenser, the outer surface of which is disposed substantially parallel to the surface of the spreading tube 18, is maintained at a temperature lower than the melting point of zinc (viz 420° C.) so that the zinc vapor is progressively condensed thereon in the form of a solid collar which is designated 33 in Figure 1.

It will thus be evident that the condensing surface is disposed as close as is practicable to the evaporating surface thereby providing the conditions necessary to obtain an optimum separation of zinc.

It will be apparent that during its downward passage over the spreading tube 18, the molten lead suffers a fall in temperature equivalent to the latent heat of the zinc evaporated therefrom but such loss of heat is partly compensated by conduction through the spreading tube from the molten metal surrounding the latter. In any event when the molten metal is supplied at a sufficiently high temperature, the heat so lost is not sufficient to impair the efficiency of the operation.

If, however, the molten metal is supplied to the chamber at a lower temperature, such that the heat lost within the chamber would otherwise impair the efficiency of separation, the construction of the vacuum chamber may be modified as shown in Figure 4 in order that the lower portion of the spreading tube may be heated by means of burners to compensate for the loss of heat due to evaporation and the heat so supplied may be sufficient to raise the temperature of the outgoing metal above that of the metal entering the chamber.

When the collar 33 of condensed zinc has accumulated to a sufficient extent, the operation is suspended by restoring atmospheric pressure within the chamber, so that the cover 15 may be removed to permit of the separation of the zinc metal therefrom and it will be clear that this operation is facilitated by the illustrated arrangement of the vacuum pipe 11 as the connections of the latter are not disturbed.

It is also to be observed that the downwardly convergent form of the condenser facilitates the removal therefrom of the collar 33 of zinc metal. If the collar should tend to slip downwardly on the condenser while the apparatus is in use, the exterior surface of the condenser may advantageously be provided with spaced longitudinally extending ribs as shown in broken lines at 35 in Figure 2.

In the modified construction shown in Figure 5 a substantially helical channel 36 is provided on the inner surface of the spreading tube by welding thereto the lower edge of an inclined strip of metal, the channel being thus of triangular and downwardly convergent shape in cross-section, so that the free surface area of the molten metal which flows downwardly therethrough is large in relation to the volume thereof.

In this construction the molten metal passes into the upper end of the channel through an opening 37 in the wall of the tube 18, so that the control ring 23 previously described is eliminated.

Preferably transverse weirs (not shown) are arranged at intervals along the length of the channel, so that molten metal is retained in each section thereof between an adjacent pair of such weirs.

I claim:

1. Apparatus for separating and recovering a relatively volatile constituent from a molten metal complex comprising a vacuum chamber, a vertically elongated condenser therein, means forming within the chamber a downwardly convergent inwardly facing spreading surface which extends around and is spaced from the condenser, means for progressively supplying to an upper portion of the chamber, the molten metal to be treated, means for directing the metal so supplied to the chamber to an upper portion of said spreading surface whereby it flows downwardly thereover in the form of a thin tubular stream and means for discharging from a lower portion of the chamber the treated molten metal.

2. Apparatus for separating and recovering a relatively volatile constituent from a molten metal complex comprising a vacuum chamber, a vertically elongated condenser arranged centrally within the chamber, a substantially cylindrical but downwardly convergent spreading tube arranged concentrically about the condenser with its upper surface disposed in a horizontal plane, said vacuum chamber being so shaped as to form around the upper end portion at least of the spreading tube, an annular reservoir for the molten metal to be treated, means for directing the molten metal into the reservoir whereby it overflows the upper end of said spreading tube and then downwardly over the inner surface of the latter as a thin tubular stream, means for discharging the treated molten metal from a lower portion of the vacuum chamber, and adjustable levelling means supporting the vacuum chamber.

3. Apparatus according to claim 2 including a ring arranged above and spaced from the upper end of said spreading tube to form therebetween a narrow substantially continuous annular slot through which the molten metal passes to the inner surface of the spreading tube.

4. Apparatus for separating and recovering a relatively volatile constituent from a molten metal complex comprising a vacuum chamber open at the top, a removable cover normally closing and sealing the upper end of the chamber, a vertically disposed condenser secured to the underside of said cover and depending therefrom centrally within the chamber, said condenser having a central passage formed therein and extending upwards from the lower end thereof, means fixed to the vacuum chamber and forming concentrically around the condenser a substantially cylindrical inwardly facing spreading surface, means for progressively supplying to an upper portion of said spreading surface, the molten metal to be treated, means for discharging the treated molten metal from a lower portion of the chamber and a vacuum pipe fixed to said chamber and extending upwards into and spaced from the wall of said central passage of the condenser.

5. Apparatus for separating and recovering a relatively volatile constituent from a molten metal complex comprising a vacuum chamber, which is open at its upper end, a removable cover normally closing and sealing said upper end of the chamber, a vertically disposed condenser secured to the underside of the cover and depending therefrom, the lower end portion at least of said condenser being formed with a central passage, means fixed to the vacuum chamber and forming a substantially cylindrical and inwardly facing spreading surface which is spaced from and arranged substantially concentrically about the condenser, means for progressively supplying the molten metal to be treated to an upper portion of the spreading surface, means for progressively discharging molten metal from the lower end portion of the chamber and a vacuum pipe extending upwardly through the bottom of the vacuum chamber and extending into said central passage in the condenser.

6. Apparatus for separating zinc from zinciferous lead by vacuum distillation comprising a vacuum chamber which is open at its upper end, a cover normally closing and forming an air-tight seal with the upper end of the chamber, a vertical annular condenser secured to and depending from the underside of the cover within the chamber with its lower end disposed somewhat above the bottom thereof a substantially cylindrical downwardly convergent spreading tube arranged concentrically about the condenser and having its upper end arranged to form an annular weir, a control ring arranged coaxially above the weir and defining therebetween a narrow slot, an annular reservoir surrounding the said weir with its inner wall formed by said control ring and said spreading tube, a passage for supplying molten metal to said annular reservoir by atmospheric pressure whereby the level of the molten metal in said reservoir is normally disposed above the weir so that same flows through the said narrow slot and then downwardly over the inner surface of the spreading tube in the form of a thin tubular stream, a discharge outlet at the lower end of the vacuum chamber for the treated molten metal, said outlet communicating with a discharge passage of such length and disposition as to accommodate a barometric column of the molten metal and a vacuum pipe extending upwardly through the bottom of the chamber and into the central passage in the condenser.

7. Apparatus according to claim 6 wherein said spreading tube is arranged wholly within and is spaced from the wall of the vacuum chamber and incorporates a flexible joint adjacent the lower end thereof and including adjustable supporting and levelling means for the chamber and means extending through said annular reservoir and supporting said spreading tube adjacent its upper end on the wall of said chamber.

8. Apparatus for separating and recovering a relatively volatile constituent from a molten metal complex comprising a vacuum chamber, a vertically elongated condenser arranged approximately centrally within the chamber, means defining within the chamber a substantially vertically extending and substantially cylindrical inwardly facing evaporating zone which extends around and is spaced from said condenser, the upper end portion at least of said last mentioned means being spaced inwardly from the wall of the chamber to form therebetween and within the chamber a well to contain a body of the molten metal to be treated, means forming a passage for the supply of molten metal from the exterior of the chamber to said well, means for the continuous discharge of molten metal from said well to the upper end of said evaporating zone, and means forming a passage for the discharge from the lower end portion of said chamber of molten metal low in said volatile constituent.

9. Apparatus for separating and recovering a relatively volatile constituent from a molten metal complex comprising a vacuum chamber, a vertically elongated condenser arranged approximately centrally within the chamber, means defining within the chamber a substantially vertically extending and substantially cylindrical inwardly facing evaporating zone which surrounds and is spaced from said condenser, the upper end portion at least of said last mentioned means being spaced inwardly from the wall of said chamber to form therebetween and within the chamber a substantially annular well to contain a body of the molten metal to be treated, a control ring arranged coaxially above and close to the upper end of said means defining the evaporating zone whereby a narrow substantially continuous slot is formed therebetween and about the condenser for the inflow of molten metal from said well to the upper end of the evaporating zone, means forming a passage for the supply to said well of molten metal from the exterior of the chamber and means forming a passage for the discharge of molten metal low in said volatile constituent from the lower end portion of the chamber inwardly of said evaporating zone.

10. Apparatus for separating and recovering a relatively volatile constituent from a molten metal complex comprising a vacuum chamber, a vertically elongated condenser arranged approximately centrally within the chamber, a substantially vertically disposed and substantially cylindrical spreading member surrounding and spaced from the condenser, said cylindrical spreading member being spaced inwardly from the wall of the chamber and having its lower end connected to the bottom thereof whereby an annular well for molten metal is formed therebetween, means forming a passage for the supply of molten metal to said well from the exterior of the chamber, means for continuously discharging molten metal from the upper end portion of said well and distributing same around the inner periphery of the upper end portion of said spreading member whereby same flows downwards thereover and means forming a passage for the discharge of molten metal low in said volatile constituent from the lower end portion of the chamber inwardly of said spreading member therein.

11. Apparatus for separating and recovering a relatively volatile constituent from a molten metal complex comprising a vacuum chamber, a vertically elongated condenser arranged approximately centrally within the chamber, a substantially vertically disposed and substantially cylindrical spreading tube surrounding and spaced from the condenser and connected at its lower end to the bottom of the chamber, said spreading tube being spaced inwardly from the wall of the chamber to form therein a substantially annular well for the molten metal to be treated, a control ring arranged coaxially above the upper end of the spreading tube and spaced from the latter to form therebetween a narrow substantially continuous circumferential slot through which molten metal may pass from the well to the interior of said spreading tube, means forming a passage for supplying molten metal to said well from the exterior of the chamber and means forming a passage for discharging molten metal from the lower end portion of the chamber inwardly of said spreading tube.

12. Apparatus for separating and recovering a relatively volatile constituent from a molten metal complex comprising a vacuum chamber, a vertically elongated condenser arranged substantially centrally within the chamber, a substantially vertically disposed and substantially cylindrical spreading tube surrounding and spaced from the condenser within the chamber with its upper end disposed substantially in the horizontal plane, means supporting said spreading tube adjacent its upper end, means including a flexible joint connecting the lower end of said spreading tube to the bottom of the chamber, said spreading tube being spaced inwardly from the wall of the chamber whereby an annular well is formed therebetween and within the chamber, a control ring arranged coaxially above the upper end of the spreading tube and spaced therefrom to form a narrow circumferential slot therebetween and through which molten metal may pass from said well to the interior surface of said spreading tube, means forming a passage for the supply of molten metal from the exterior of the chamber to said annular well and means forming a passage for discharging molten metal low in said volatile constituent from the lower end portion of said chamber interiorly of said spreading tube.

13. Apparatus for separating and recovering a relatively volatile constituent from a molten metal complex according to claim 12 including adjustable levelling means supporting said chamber whereby said upper end of the spreading tube therein may be maintained horizontally.

14. Apparatus for separating and recovering a relatively volatile constituent from a molten metal complex comprising a vacuum chamber which is open at its upper end, a detachable cover normally closing and sealing said open upper end of the chamber, a substantially vertically disposed condenser secured to and depending from said cover approximately centrally within the chamber and having its lower end disposed above but adjacent to the bottom of the latter, said condenser being formed with a central passage which extends upwardly therein from its lower end, a vacuum pipe fixed to said chamber and extending upwardly into and spaced from the wall of said passage in the condenser, a vertically elongated tubular spreading means surrounding and spaced from the condenser, means for supplying molten metal to be treated to the upper portion of the interior of said spreading means whereby it flows downwardly therein and in lateral opposition to said condenser and means forming a passage for the discharge of molten metal low in said volatile constituent from the lower end portion of the chamber inwardly of said spreading means.

15. Apparatus for separating and recovering a relatively volatile constituent from a molten metal complex comprising a vacuum chamber, a substantially vertical condenser disposed approximately centrally within the chamber and pendent from the top thereof, said condenser having its lower end disposed above but adjacent to the bottom of the chamber and having therein a substantially central passage which extends upwardly from its lower end, means forming a vacuum passage which communicates directly with said central passage in the condenser whereby the interior of said chamber is maintained under vacuum by the withdrawal of gases therefrom through said passage in the condenser, means forming a vertically extending evaporating zone around and spaced from the condenser, means for supplying molten metal to be treated to the upper end portion of said evaporating zone and means for discharging molten metal low in said volatile constituent from the lower end portion of said chamber.

THOMAS R. A. DAVEY.

REFERENCES CITED

The following references are of record in the file of this patent:

UNITED STATES PATENTS

| Number | Name | Date |
| --- | --- | --- |
| 2,239,370 | Osborn et al. | Apr. 22, 1941 |
| 2,239,371 | Osborn et al. | Apr. 22, 1941 |